R. CHESTER.
Signal Lantern.
No. 37,032.
Patented Dec. 2, 1862.
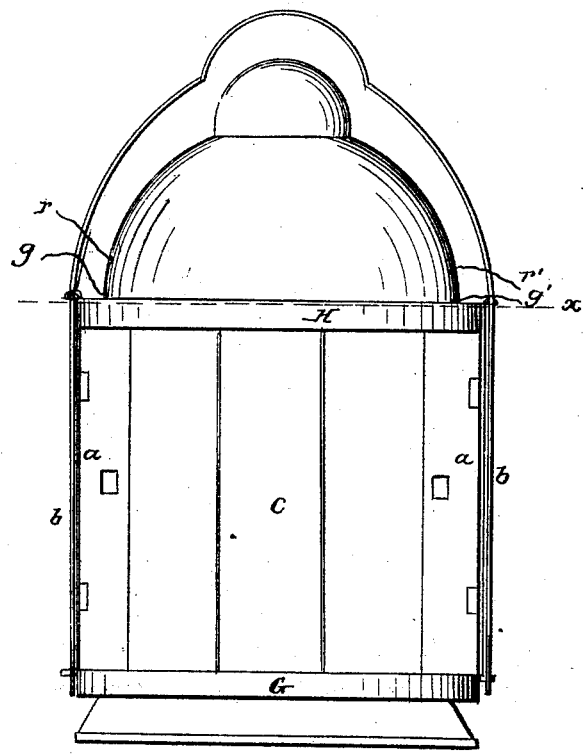
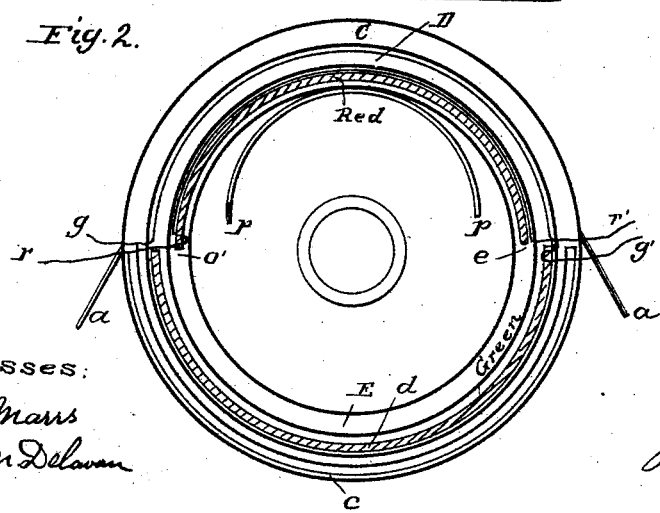

UNITED STATES PATENT OFFICE.

RICHARD CHESTER, OF CHICAGO, ILLINOIS.

IMPROVEMENT IN SIGNAL-LANTERNS.

Specification forming part of Letters Patent No. 37,032, dated December 2, 1862.

*To all whom it may concern:*

Be it known that I, RICHARD CHESTER, of Chicago, in the county of Cook and State of Illinois, have invented a new and useful Improvement in Signal-Lanterns; and I do hereby declare that the following is a full, clear, and exact description thereof, reference being had to the accompanying drawings and the letters and figures marked thereon, which form a part of this specification.

In said drawings, Figure 1 represents a front view of my improved lantern, showing the white glass or screen; and Fig. 2 represents a horizontal section at the line $x$.

Similar letters in the different figures represent corresponding parts of my invention.

The nature of my invention consists in constructing a signal-lantern in such a manner that the different-colored glasses which are used in giving the various signals can be revolved around in front, so as to display the required colored light without opening the lantern for that purpose, and so without risk or danger of the lights being extinguished by the wind, and also in constructing the reflector in such a manner that the light is reflected with equal brilliancy in all the directions in which the light is required to be displayed.

To enable those skilled in the art to construct and use my invention, I will now proceed to describe the same with particularity.

The lantern is constructed of tin and glass, and externally may be of any of the usual forms; but in the bottom of the lantern there are circular grooves extending around the bottom, lying one within the other, formed by annular ledges or projections, and also similar and corresponding grooves in the top or upper part of the lantern at H. The number of these grooves corresponds to the number of glasses which are required to be used. The different glasses are set in semicircular frames in strips, as shown in Fig. 1, or in one entire piece, as shown in Fig. 2, and these frames are situated in the grooves C D E, and revolve freely within them, the lower part of said frames or screens resting in the lower grooves, and the top of the frames supported by the upper grooves.

These glasses are revolved into the desired positions by means of the cords $r$ $r'$ $g$ $g'$, which are attached to the frames at the upper ends, and at one corner being inserted in perforations through the frames, when a knot is tied in the ends of the cords to prevent their drawing through; or they may be attached to the frames in any suitable manner. Two cords are attached to each glass, as seen in Fig. 2.

The red and black dotted lines (marked $r$ $r'$) are attached to the red glass at its left-hand upper corner, the cord $r$ passing directly out through the orifice, as shown in Fig. 1, while the cord $r'$ passes around in the groove and passes out at a point opposite the place where $r$ goes out.

When the glasses are in the back of the lantern, the arrangement regarding each is exactly similar to that regarding the red glass just described.

The green glass is shown in front in Fig. 2.

To display the red light would be effected as follows: By drawing upon the cord $g$, which is fastened to the green glass at $o$, the green glass will be drawn around to the back of the lantern, leaving the white glass $e$ in front. By drawing upon the cord $r'$, which is fastened to the red glass at $o'$, the red glass will in a similar manner be drawn around to the front of the lantern, thereby displaying the red light.

$b\ b$ are rods which hold G and H together, there being also a similar rod at the back of the lantern. (Not shown in the drawings.)

The wings $a$ are hung upon hinges, and are thrown open, as shown in Fig. 2, when the lantern is being lighted; but when lighted the white glass is brought around to the front, and the wings $a$ are folded against the glass to exclude the wind, when all the necessary signals may be displayed by simple operations, as described and shown, with the cords $r$ $r'$ $g$ $g'$.

The walls of the lantern are opaque, excepting in the front.

The reflector is curved laterally, and the sides $p$ are brought so far forward that they will reflect the light toward either side as well as in front.

I claim as my invention—

The combination and arrangement of the glasses $c$ $d$ $e$, (whether set in frames or not,) the grooves C D E, and the cords $r$ $r'$ $g$ $g'$, and second, the arrangement of the wings $a$ with the glass $o$, all constructed and operating substantially as and for the purposes delineated and set forth.

R. CHESTER.

Witnesses:
  M. E. GRAY,
  CHARLES E. THOMPSON.